Sept. 7, 1965  M. A. SCHEG  3,205,478
HIGHWAY CROSSING WARNING LAMP
Filed Dec. 11, 1961  3 Sheets-Sheet 1

INVENTOR.
M.A. SCHEG
BY
HIS ATTORNEY

Sept. 7, 1965   M. A. SCHEG   3,205,478
HIGHWAY CROSSING WARNING LAMP
Filed Dec. 11, 1961   3 Sheets-Sheet 2
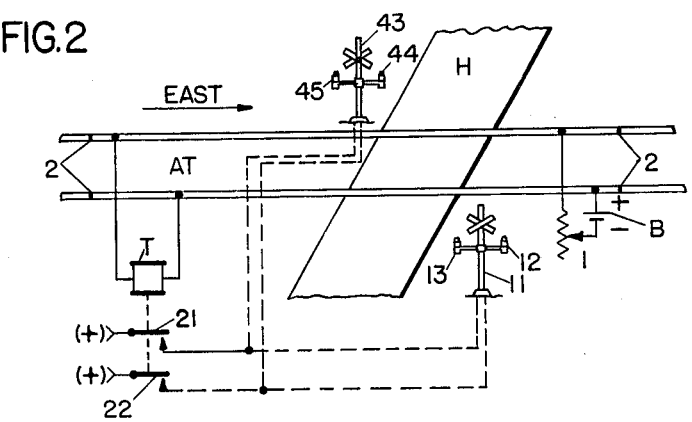
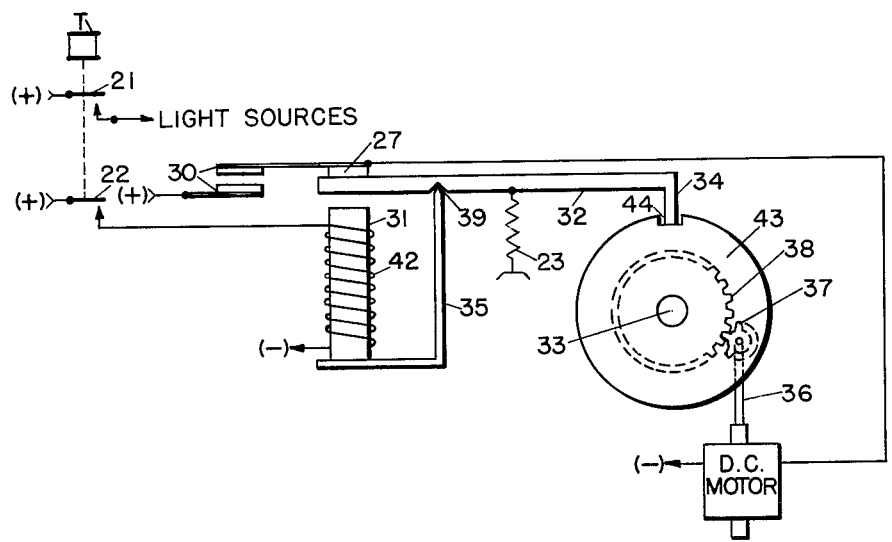
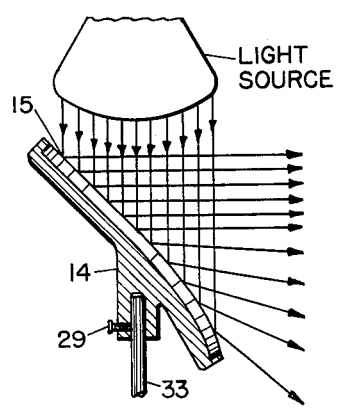
INVENTOR.
M.A. SCHEG
BY
HIS ATTORNEY Sept. 7, 1965 M. A. SCHEG 3,205,478
HIGHWAY CROSSING WARNING LAMP
Filed Dec. 11, 1961 3 Sheets-Sheet 3

INVENTOR.
M.A. SCHEG
BY
HIS ATTORNEY

3,205,478
HIGHWAY CROSSING WARNING LAMP
Marcian A. Scheg, Rochester, N.Y., assignor to General Signal Corporation
Filed Dec. 11, 1961, Ser. No. 158,198
2 Claims. (Cl. 340—47)

This invention relates to a highway crossing warning lamp and more specifically relates to a highway crossing warning lamp employing a rotating reflector.

Heretofore in the use of signal lamps or lights at railroad highway crossings, it has been common practice to employ two pair of lamps mounted along side the highway adjacent the railroad track. Each lamp of a given pair is mounted back to back to project a warning beam for both directions of traffic along the highway. The lamps are energized by a train entering the approach track section to the highway crossing and means are provided for alternately energizing the source of light in each pair of lamps in order to provide a more arresting warning to the drivers of vehicles or pedestrians using the highway.

Another design consideration affecting the structure of current optical systems of such highway crossing warning lamps is that suitable lenses must be provided for the horizontal dispersion of the light emanating from the signal lamp in order to provide a horizontal light beam width sufficient to cover a desired area of the highway. Moreover, the lens structure used also must be such that a portion of the light beam is projected downwardly in order that viewers may see the warning indication when approaching close to the warning lamp.

Warning lights of this type are subject to certain disadvantages in that the human eye's reaction to flashing light tends to lag and the effectiveness of the warning light is limited. Also as the filaments of the flashing lights heat and thereafter cool the contrast between "off" and "on" becomes ineffective. Another deficiency arises in the employment of lenses for horizontal and vertical light dispersion in that such dispersion of the light beam causes a reduction in the intensity of the beam at any given point.

In view of the above, the present invention proposes to provide an optical system in which a fixed source of light is mounted so as to project light rays upon a rotatable reflector in such manner as to project a substantially horizontal beam of light which may be rotated throughout the perimeter of the lamp. A blind is then mounted about the perimeter of the lamp containing an opening for restricting the passage of light from the rotating light beam to this opening. In this manner a concentrated beam of light measured horizontally can be projected onto the highway to provide the necessary warning of the approaching train to the pedestrians and vehicles using the highway and yet not be projected in the direction of the approaching train.

Additionally, by increasing the number of openings in the blind surrounding the perimeter of the lamp, a concentrated light beam of any desired horizontal arc may be made to project onto each one of any configuration of highways crossing a railroad track. Furthermore, in order to insure that the operator of a vehicle passing over the highway can see the projected light beam when he approaches the warning light, the lower portion of the rotatable reflector is angled so that a portion of the light beam is projected downwardly from the horizontal in order to provide a warning indication until the viewer passes under the signal.

The present invention also includes means for stopping the rotating light beam at one selected opening in the blinds. Therefore should the driving means of the rotatable reflector fail to start, a steady warning indication of the approaching train will be projected in the direction of oncoming traffic. Thus it can be seen that the highway crossing signal is on the side of safety.

One object of the present invention is to provide a highway crossing signal with an optical system which will provide the equivalent of a flashing light signal yet is free from the deficiencies recited above.

Another object of this invention is to provide a rotating highway crossing signal which will return to a selected position after an approaching train has cleared the highway crossing.

A further object of the present invention is to provide an optical system for a highway crossing signal capable of projecting an arresting light beam which will be readily discernible by a viewer at a distance from the light source and when close to the light source.

A further object of the present invention is to provide an optical system for a highway crossing signal which will provide a desired horizontal and vertical light beam width yet eliminates the need for lenses for light dispersion.

Other objects, purposes and characteristic features of the present invention will be obvious from the accompanying drawings and in part pointed out as the description of the invention progresses.

In describing the invention in detail, reference will be made to the accompanying drawings and in which:

FIG. 2 is a diagrammatic illustration of one form of approach track detector circuit which may employed to control the highway crossing signal of the present invention;

FIG. 3 illustrates one method of mounting the rotatable reflector of the present invention;

FIG. 5 is a schematic illustration showing the control circuit for one embodiment of the present invention;

Figure 1:
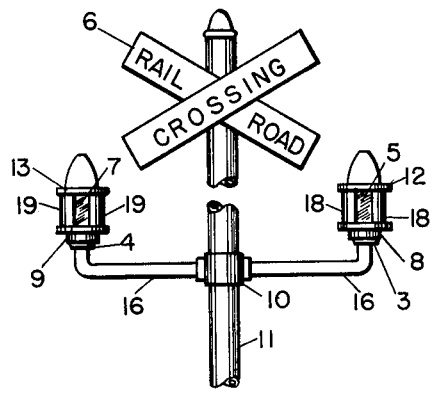
FIG. 1 illustrates one manner of mounting one embodiment of the present invention on a supporting mast.

Referring to the drawings wherein FIG. 1 represents a fragmentary view of a standard 11 which is mounted in any well-known manner, for example as shown in FIG. 2, adjacent a highway crossing. The standard 11 carries the usual "cross buck" warning sign 6 having two arms carrying the words "RAILROAD CROSSING" thereon. The standard 11 also carries conduit type supports 16 and a suitable fastening collar 10 for supporting the warning lamps 12 and 13 upon the standard 11.

The warning lamp 12 is shown as having a dome-like upper portion which houses a sealed beam spot lamp which projects its beam down upon a rotatable reflector located in the central glass enclosed portion 5 of the lamp. The reflector is rotated by a D.C. motor located in the base portion 8. The base portion contains a pipe flange 3 for conduit mounting of the warning lamp. The center portion of the warning lamp is composed of circular transparent glass 5 which is surrounded by a blind 18. The arrangement of the blind 18 is such that an intense beam of light of suitable horizontal beam width is projected through the opening in the blind 18 of the warning lamp onto the highway. The mechanical arrangement of the warning lamp 13 is exactly as that described for the warning lamp 12. FIG. 2 is a simplified schematic diagram of one form of approach detector track circuit which may be employed to energize the light sources and the driving means of the warning lamps of the present invention. The approach track section AT has a track circuit including a battery B and the windings of the track relay T. The stretch of track AT is electrically isolated by insulated joints 2. The relay T is normally energized by a circuit which can be traced from the positive side of the battery, one rail of the track section AT, the windings of the relay T, the other rail of the track section AT, the limiting resistor 1 and (−) of the battery B. The arrival of a train on the track section AT will produce a low resistance shunt through the wheel and axle assembly of the cars which serves to lower the voltage across the windings of the relay T causing its armature to drop away. The closure of back contact 21 of the relay T provides positive energy for the light sources of the highway crossing warning lamps. The closure of back contact 22 provides a positive energizing source for a circuit which unlocks the D.C. motor.

The light source of each highway crossing warning lamp (FIG. 3) is preferably a seal beam spot lamp which projects its beam downwardly upon a rotatable reflector 15. The upper portion of the reflector 15 is set at an angle of approximately 45 degrees and the lower portion is set at any angle which will project a portion of the light downwardly for close viewing whenever a pedestrian or a driver of a vehicle approaches close to the warning lamp. The reflector is mounted on any suitable type of turntable such as channelled mounting frame 14 affixed to drive shaft 33 by means of pressure screw 29.

The source of light in FIG. 3 is idealized with the arrows indicating only those light rays projected in a substantially horizontal direction and those light rays projected in the selected vertical direction. Therefore FIG. 3 presumes a point source of light, a perfect lamp reflector, and lens and a perfect rotating reflector. However, the simplified form of FIG. 3 is sufficient for the purposes of this disclosure, in that the light rays of interest are shown.

The upper portion of the reflector 15 will project a substantially horizontal beam of light from the highway crossing warning lamp. The angle of curvature of the lower portion of the reflector structure is such that the width of the light beam reflected will be on the order of 15° from the horizontal. Of course, any desired beam width may be diverted from the horizontal by varying the area of the lower portion of the reflector with respect to the upper portion of the reflector.

Since the reflector is rotated by the shaft 33, the warning indication may be provided over 360 degrees. However, in order to provide a more arresting aspect and to insure that the rotating beam will not be directed towards an approaching train, blinds are proposed to shield the warning indication except in the direction and over the areas necessary to provide a warning for pedestrians and/or vehicular traffic (FIG. 4).

Figure 4:
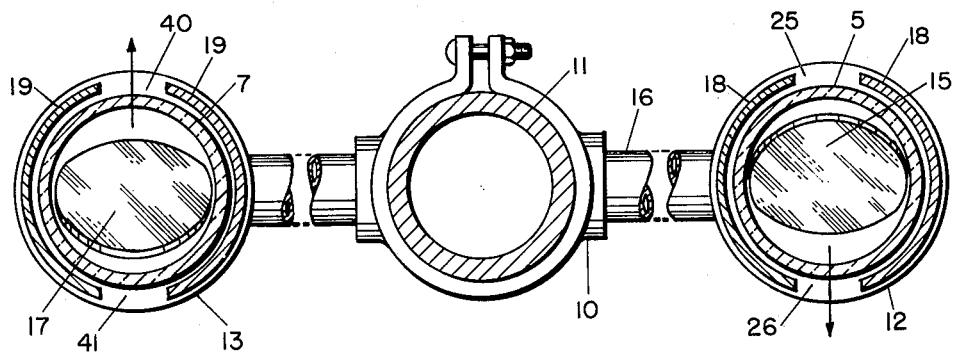
FIG. 4 is a top sectional view of two lamps of a highway crossing signal with normal stopping positions in opposite directions.

FIG. 4 illustrates a top view of a lamp and blind configuration that may be used to illustrate this embodiment of the present invention. Blinds 18 and 19 are shown mounted in channel grooves about the transparent glass enclosed center portions 5 and 7 of the warning lamps 12 and 13. Referring to warning lamp 12 it can be seen that the shield 18 has diametrically opposite openings 25 and 26 through which a beam of light will be projected by the rotating reflector 15. This configuration would have value in an intersection consisting of a single highway crossing a railroad track.

Assuming the rotating reflector 15 has a normal starting position as indicated by the arrow, a beam of light will be projected onto that portion of the highway directly in front of the lamp opening 26. When the reflector 15 is rotated about the perimeter of the lamp 12 to the second opening 25, a warning beam would be projected to provide a warning to traffic approaching the highway crossing in the opposite direction. In a similar manner any number of openings may be provided in the blinds 18 to provide a warning indication to the occupants of any highway configuration at a railroad crossing.

Similarly, lamp 13 is shown as having a shield 19 to absorb the light projected about the perimeter of the lamp by the revolving reflector 17. Lamp 13 is shown as having a normal stopping position as indicated by the arrow at opening 40. Thus a warning beam is projected from a normal starting position which is opposite to that shown for the lamp 12. Therefore when the light sources are initially energized, a warning indication of the approaching train is provided for traffic along both sides of the highway intersected by the railroad tracks. The driving means for the reflectors 17 and 15 are arranged so that when the reflector 17 is rotated to project a beam of light through the opening 41 in the blind 19, the reflector 15 will project a beam of light through the opening 25 in the blind 18. Thus an arresting warning display is continually being provided for both directions of traffic movement toward the intersection.

From the above it can be seen that if a similar warning lamp arrangement were provided on the opposite side of the highway intersected by the railroad tracks there would be a continued interplay of the warning beams from each lamp such that any given portion of the highway would be swept by a warning indication from each of the four warning lamps as their reflectors were rotated about the perimeter of the lamp.

Moreover, as the driving means for each reflector is a small D.C. motor and therefore presents the possibility of failing to start, means are provided which will insure that the rotating reflectors stop at a selected opening in the blinds each time a train passes over the highway crossing. Consequently, a steady warning indication will be visible to traffic moving along that portion of the highway monitored by a given warning lamp should be driving motor fail to restart. Therefore referring to FIG. 4, and assuming a situation where the D.C. motors for both the lamp 12 and 13 were rendered inoperative, the rotating reflectors 15 and 17 would stop in the position shown and therefore provide a steady warning indication to opposite sides of the highway intersected by the railroad track. Assuming a similar warning lamp arrangement on the opposite side of the highway it can be seen that if all four D.C. motors which drive the rotating reflectors failed to start upon the approach of a train, each portion of the highway would be covered by two steady warning indications provided by a warning lamp located on opposite sides of the highway. The circuit arrangement for stopping the rotation of a given reflector at a selected opening in the blinds in shown in FIG. 5.

The circuit arrangement is shown only for one warning lamp but it is to be understood that similar apparatus is provided for each lamp in any selected configuration. FIG. 5 shows a D.C. motor having a shaft 36 with a pinion gear 37 at the end thereof. The rotatable reflector 15 is mounted upon the drive shaft 33 (FIG. 3) and is rotated over the lamp perimeter by the interlocking of the pinion gear 37 and the gear 38 which is integrally connected to disc 43.

Also shown is an electromagnet having winding 42 and armature 32. The armature 32 is mounted upon a pivot 35, one end of which is affixed to the core 31 of the magnet and the other end of which is inserted in the notch 39 of the armature 32. As can be seen the armature is L-shaped with foot 34 projecting into the notch 44 of disc 43. The balance of the armature 32 on the pivot 35 is such that when the foot 34 of the armature is inserted in notch 44 of disc 43, the opposite end of the armature supports contact 27 in such manner that contacts 30 are held open. Spring 23 which is normally biased to contract insures that foot 34 will slip into the notch 44.

As contacts 30 are included in the energizing circuit for the D.C. motor, it can therefore be seen that as long as these contacts are opened the reflector cannot be rotated. It can also be seen that if a suitable source of energy is provided for the windings 42 of the electromagnet, it will attract the pivoted armature 32 to its core 31, simultaneously closing contacts 30 and removing the L-shaped foot 34 of the armature 32 from the notch 44 permitting rotation of disc 43 and also of the reflector drive shaft 33 fastened thereto.

Figure 6:
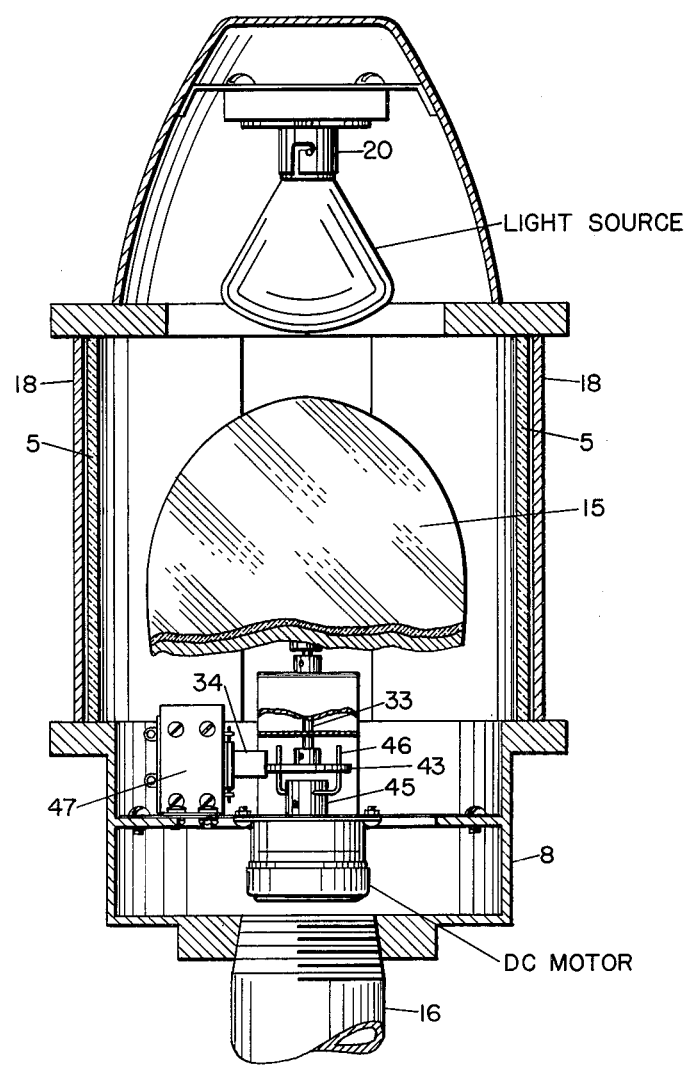
FIG. 6 is a front sectional view illustrating the structure of one embodiment of the present invention.

FIG. 6 is a front sectional view of the present invention illustrating a second structural arrangement for rotating the reflector shaft 33. The small D.C. driving motor is shown affixed to a plate in the base portion 8 of the highway crossing warning lamp 12. A drive shaft 45 is connected to the motor through a gear box which provides for rotating of the shaft 45 at a suitable speed less than that of the motor. Affixed to the shaft 45 are two spindles 46 which pass through oversized holes in the cam 43 thereby driving the cam at the same rate of speed as the shaft 45.

A relay 47 is substituted for the electromagnet and pivoted armature of the embodiment previously discussed. Attached to the armature of the relay 47 is a projection 34 which fits into a slot on the cam 43. The mechanical arrangement is such that when the relay is energized picking up its armature, the projection attached to the armature is moved out of the groove in the cam 43 and in the same manner previously discussed energy is applied to the D.C. motor when the relay closes its front contacts. When the train passes out of the approach track section the relay 47 is deenergized but the armature does not drop away until the projection 34 again moves back into the groove portion of the cam 43.

When the armature drops away and the contacts of the relay finally open, energy will be removed from the D.C. motor. It can be seen that this arrangement operates as an universal joint system and because the spindles 46 projects into oversized holes in the cam 43 the reverse torque applied to the shaft 45 is not too severe.

FIG. 6 also illustrates one manner of mounting the light source in the dome-like portion of the lamp by means of bayonet socket 20. The rotatable reflector 15 is shown mounted upon the shaft 33 located in the central portion of the lamp surrounded by the transparent glass 5 and the shield 18. A conduit pipe 16 having a threaded end portion is shown mounted in the flange portion in the base of the lamp. In order to simplify the diagram the wiring which normally passes through the conduit 16 has been eliminated.

More specifically, let us assume a train enters the approach track section AT (FIG. 2) causing the relay T to become deenergized. Closure of back contact 21 will provide an energizing circuit for the individual light sources of the warning lamps. The closure of back contact 22 of the relay T (FIG. 5) will provide energy for the winding 42 of the electromagnet through an obvious circuit. Energization of the electromagnet will attract its armature 32 to the core 31. Consequently, the armature 32 will move about the pivot 35 allowing contacts 30 to close and simultaneously removing foot 34 from the notch 44 of the disc 43. With energy now available at the D.C. motor and foot 34 removed from the notch 44, the motor shaft 36 through the pinion gear will rotate the reflector 15 (FIG. 3) by means of drive shaft 33. As the reflector 15 is rotated about the perimeter of the lamp 12 (FIG. 4), a beam of light will be projected horizontally and downwardly through openings 26 and 25 of the blind 18.

As long as the track relay is deenergized by the presence of the train in the approach track section AT, energy will be provided for the D.C. motor and the rotating reflector will continue to project a warning beam over the highway.

When the approaching train passes beyond the track joints 2 on the opposite side of the highway, the detector track relay T will again become energized opening its back contacts 21 and 22. The opening of back contact 21 will remove energy from the light sources and the opening of back contact 22 will open the energizing circuit for the winding 42 of the electromagnet. Only when the armature 32 moves back to its normal position as shown in FIG. 5 will contacts 30 again be opened and energy removed from the D.C. motor. Therefore the disc 43 will continue to rotate with the foot 34 in contact with its outer perimeter until the foot of the armature 32 falls into the notch 44 on the disc 43.

As the disc 43 may be considered an image of the perimeter of the lamp 12, the notch 44 can be determined so as to stop rotation of the reflection 15 at any selected opening in the blind. Therefore, the warning lamp is on the side of safety, in that should the D.C. motor fail to restart, the reflector 15 may be caused to stop at a selected opening in the blind and project a steady warning beam onto the highway.

In this embodiment of the present invention it is apparent that a highway crossing warning lamp has been shown which will project an arresting warning light through any selected opening in the blinds mounted around its perimeter and a portion of this warning light beam has been deflected downwardly for close viewing by the operators of vehicles and/or pedestrians moving past the base of the lamp. Also, a circuit arrangement has been shown which is fail-safe in that the reflector can be made to stop at any selected opening in the blinds thereby providing a steady warning indication of an approaching train should the driving means of the reflector fail to restart.

Having thus described one embodiment of the present invention, it is understood that this form has been selected to facilitate in the disclosure of the invention rather than to limit the number of forms which it may assume. Also it is to be understood that various modifications, adaptations and alterations may be applied to the specific form shown to meet the requirements of practice, without in any manner departing from the spirit or scope of the present invention.

I claim:

1. A warning lamp unit adapted for providing optical warning of the presence of railway trains at a highway crossing comprising:
    (a) a light source energized in response to the presence of a railway train at said highway crossing,
    (b) a movable reflector effective to receive and reflect the light from said energized light source as a warning light beam toward said highway,
    (c) driving means comprising electric driving motor circuitry adapted to be started when energized in response to the presence of said railway train and operably connected to rotate said reflector, whereby said warning light beam is recurrently reflected towards said highway as a distinctive warning that said railway train is present, and
    (d) control means for stopping the rotation of said reflector when a railway train clears said highway crossing, said control means comprising a contact member actuated in response to the position of said reflector and operably connected in the energizing circuitry of said driving motor so as to maintain said motor energized until said reflector is returned for reflecting light from said source towards said highway.

2. The highway crossing warning lamp unit according to claim 1 further including shielding means having an opening therein for restricting the projection of light from said lamp unit in a direction towards said highway.

References Cited by the Examiner
UNITED STATES PATENTS

| | | | |
|---|---|---|---|
| 1,296,440 | 3/19 | Sperry | 33—226 |
| 1,687,017 | 10/28 | Grondahl | 315—162 |
| 1,782,312 | 11/30 | Payne | 246—128 |
| 1,783,634 | 12/30 | Tannehill | 200—63 |
| 1,989,295 | 1/35 | Sewell | 340—103 |
| 2,003,022 | 5/35 | Thompson | 340—25 |
| 2,203,988 | 6/40 | Griswold | 340—47 |
| 2,645,761 | 7/53 | McDowell et al. | 340—50 |
| 2,666,193 | 1/54 | Keegan | 340—49 |
| 2,748,371 | 5/56 | Wilcox et al. | 340—47 |
| 2,928,072 | 3/60 | Arnold | 340—25 |

NEIL C. READ, *Primary Examiner.*

BENNETT G. MILLER, *Examiner.*